June 19, 1928.

W. O. EDDY 1,674,242

DEHYDRATOR HAVING ROTATABLE ELECTRODE

Filed Nov. 29, 1926

INVENTOR:
WILLIAM O. EDDY.
BY Ford A. Lurie
ATTORNEY.

Patented June 19, 1928.

1,674,242

UNITED STATES PATENT OFFICE.

WILLIAM O. EDDY, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA.

DEHYDRATOR HAVING ROTATABLE ELECTRODE.

Application filed November 29, 1926. Serial No. 151,419.

This invention relates to electrical apparatus for dehydrating petroleum emulsions.

In the art it is common practice to dehydrate petroleum emulsions containing small water particles which will not gravitate therefrom, by means of an apparatus consisting of a pair of electrodes placed in a tank, between which electrodes an electric field is established. The petroleum emulsion is passed through the electric field and the electric field agglomerates the water particles into masses of water which are of sufficient size to precipitate from the oil.

It is an object of this invention to provide a dehydrator in which the emulsion is agitated in the treating space while it is subjected to the action of the electric field. This is an important object of the invention by reason of the fact that emulsions otherwise difficult to dehydrate are readily dehydrated if agitated while under the influence of the electric field.

In the ordinary dehydrator there is a tendency for the water particles to chain up between the electrodes and form short-circuiting paths which reduce the strength of the electric field and consequently reduce its treating efficacy.

It is accordingly an object of this invention to provide a dehydrator in which water particles cannot chain up between the electrodes.

A still further object of the invention is to provide a dehydrator having a revolving electrode.

A still further object of my invention is to provide a dehydrator having a number of concentric treating spaces.

Other significant objects and advantages of the invention will be made evident hereinafter.

My invention is best understood with reference to the drawing in which.

Figure 1:
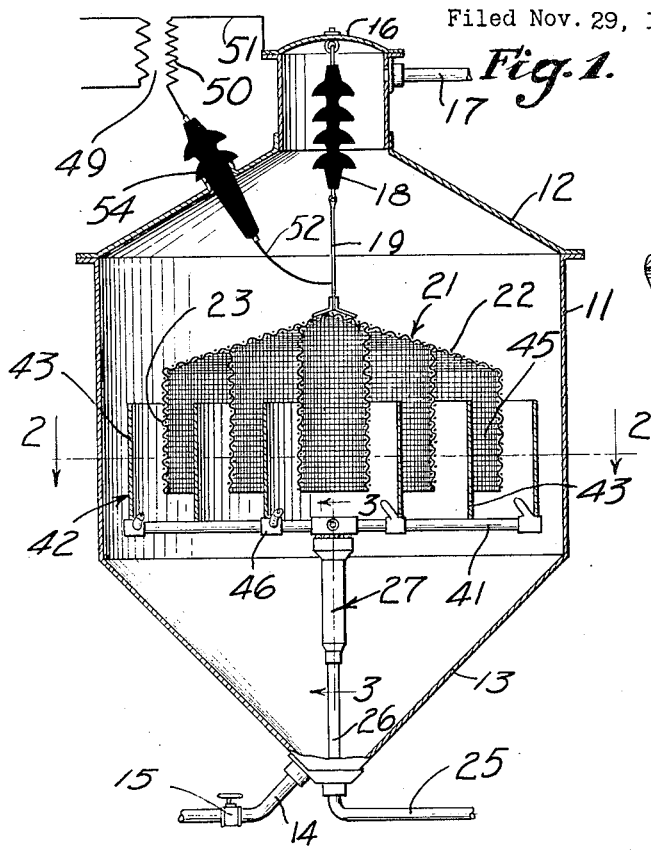
Fig. 1 is a vertical section through the invention.

Referring in detail to the drawing, I show a tank 11 having a tight top 12 and a tight conical bottom 13. Connected to the lower part of the conical bottom 13 is a water take-off pipe 14 having a valve 15. The tight top 12 is provided with a dome 16 to which a dry oil take-off pipe 17 is connected.

Supported in the upper part of the tank 11 is an insulator 18 to which a rod 19 is connected. Supported at the lower end of the rod 19 is a primary or live electrode 21. The live electrode 21 is preferably formed from a coarse screen mesh, as shown, and consists of an upper conical wall 22 and concentric cylindrical walls 23 which are arranged on a vertical axis.

Figure 3:
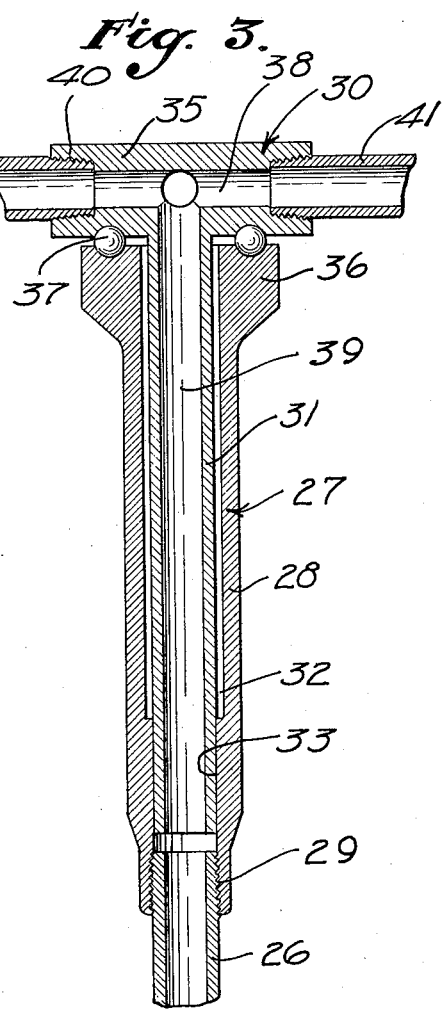
Fig. 3 is a vertical section of a bearing of the invention taken on the line 3—3 of Fig. 1.
Figure 2:
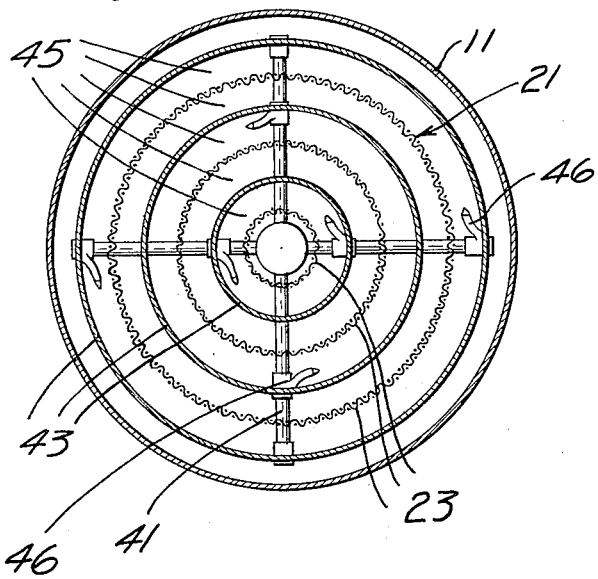
Fig. 2 is a cross section taken on the line 2—2 of Fig. 1.

Extended into the tank 11 from the lower end thereof is an emulsion inlet pipe 25 having a vertical leg 26. Supported at the upper end of the vertical leg 26 is a bearing 27. The bearing 27, as illustrated best in Fig. 3, consists of a body 28, to the lower end of which the vertical leg 26 is threadedly secured, as indicated at 29. Supported by the body 28 is a rotatable spindle 30. The spindle 30 has a vertical tube 31 which extends into an opening 32 of the body 28. The lower part of the opening 32 is provided in the form of a bearing 33 in which the lower end of the tube 31 is journaled. The upper part of the spindle 30 is provided with a head 35 which rests above an upper enlargement 36 of the body 28. Placed between the head and the enlargement are bearing balls 37 which rotatably support the spindle 30. The head 35 is provided with crossing openings 38 which connect to a vertical passage 39 formed through the tube 31. The lower end of the passage 39 connects to the passage in the vertical leg 26. Threadedly secured in outer ends 40 of the crossing openings 38 are arms 41 which are formed from pipe.

Figure 4:
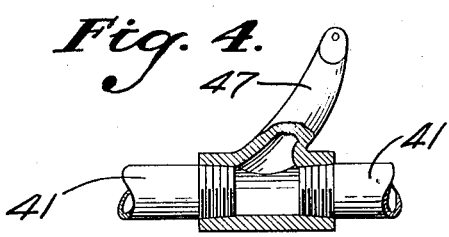
Fig. 4 is a fragmentary section of a nozzle of the invention.

Supported by the arms 41 is a secondary or grounded electrode generally indicated by the numeral 42. This grounded electrode 42 consists of concentric cylinders 43 which are arranged on the same axis as the cylinders 23 of the live electrode 21. The cylinders 23 and 43 are alternately arranged so that treating spaces 45 are provided between each pair of live and grounded cylinders 23 and 43. Carried by the arms 41 are nozzles 46. The nozzles 46 are arranged in pairs which are adapted to introduce petroleum emulsion tangentially into the treating spaces 45. Each pair of nozzles supplies emulsion to a pair of treating spaces provided between two of the cylinders 43 and on opposite sides of one of the cylinders 23. As shown best in Figs. 1 and 4, the nozzles 46 have spouts 47 which are inclined so that the emulsion is directed upward.

Referring to Fig. 1, I diagrammatically illustrate a transformer 49 having a secondary 50. One side of the secondary 50 is connected to the tank 11 by means of a wire 51. The other side of the secondary 50 is connected by means of a conductor 52 to the rod 19 which supports the live electrode 21. This conductor 52 is extended through an insulator inlet bushing 54 which is extended through the top 12 of the tank 11. The grounded electrode 42 is connected to the tank 11 and is grounded, whereas the live electrode 21 is insulated from the tank but is connected to the secondary 50 of the transformer 49.

The operation of the invention is as follows:

Emulsion to be dehydrated is supplied to the dehydrator by means of the pipe 25. The emulsion passes through the vertical leg 26, the bearing 27, and the arms 41. The emulsion is injected into the treating spaces 45 by means of the nozzles 46. The reaction of the issuance of the emulsion causes the arms and the spindle 30 to rotate. The grounded electrode 42 being supported by the arms 41 is also rotated. The rotation is produced by the same principle which causes the ordinary reaction wheel to rotate. The emulsion, as previously mentioned, is directed upward into the treating spaces 45 and the streams cause the emulsion already present in the treating spaces to be agitated. An electric field is set up in each of the treating spaces 45 at this time, the transformer 49 being energized.

As previously mentioned, the action of the electric field on the emulsion is more effective when the emulsion is agitated. It is believed that emulsion is better treated when it is agitated, on the theory that emulsion will deform under the same conditions that it forms. Releasing the emulsion through the nozzles produces a churning or beating action which is believed to be similar to the action which forms the emulsion. By agitating the emulsion in this manner a "nascent" condition is effected which assists the electric field inasmuch as it renders the water particles easily coalescible by the electric field.

It is quite impossible for water to form in short-circuiting chains between the electrodes by reason of the fact that the grounded electrode is rotated and therefore any chaining action is precluded in its initiation. The electrodes are so formed that the treated oil may readily move upward in the tank 11 and the water particles may readily drop to the bottom of the tank. The lower end of the grounded electrode 42 is entirely open whereas the live electrode is formed from a screen mesh having large interstices through which the oil may pass.

I claim as my invention:

1. In a dehydrator for emulsions, the combination of: a primary stationary electrode having a series of concentric cylinders; a secondary movable electrode having cylinders extended into the spaces between said cylinders of said stationary electrode; a tank surrounding said electrodes; means for impressing an electromotive force between said electrodes; a reaction device rotatably supported in said tank, said reaction device having nozzles directed so that fluid emitted therefrom rotates said reaction device and passes into the spaces between said electrodes, said rotatable electrode being supported by said reaction device; means for supplying emulsion to said reaction device; and means for withdrawing fluids from said tank.

2. A combination as defined in claim 1 in which one of said electrodes is a screen mesh electrode.

3. A combination as defined in claim 1 in which said primary electrode is a screen mesh electrode.

4. In a dehydrator for emulsions, the combination of: a primary stationary electrode having a series of concentric cylinders; a secondary movable electrode having cylinders extended into the spaces between said cylinders of said stationary electrode; a tank surrounding said electrodes; means for impressing an electromotive force between said electrodes; a reaction device rotatably supported in said tank, said reaction device having radial arms and nozzles supported by said arms, said nozzles being directed so that fluid emitted therefrom rotates said reaction device and passes into the spaces between said electrodes, said rotatable electrode being supported by said reaction device; means for supplying emulsion to said reaction device; and means for withdrawing fluids from said tank.

In testimony whereof, I have hereunto set my hand at Los Angeles, California, this 22nd day of November, 1926.

WILLIAM O. EDDY.